March 16, 1971     J. MICHAEL     3,570,048

APPARATUS FOR PRODUCING FISH FILLETS FREE FROM PINBONES

Original Filed April 21, 1965

INVENTOR.
JOHANNES MICHAEL

United States Patent Office 3,570,048
Patented Mar. 16, 1971

3,570,048
APPARATUS FOR PRODUCING FISH FILLETS
FREE FROM PINBONES
Johannes Michael, Harmsdorf via Ratzeburg, Germany, assignor to Nordischer Maschinenbau Rud. Baader, Lubeck, Germany
Continuation of application Ser. No. 623,488, Feb. 14, 1967, which is a division of application Ser. No. 449,842, Apr. 21, 1965, now Patent No. 3,319,287, dated May 16, 1967. This application Aug. 5, 1969, Ser. No. 863,405
Int. Cl. A22c 25/16
U.S. Cl. 17—56
2 Claims

ABSTRACT OF THE DISCLOSURE

Apparatus for producing fish fillets free from pinbones, wherein the fish is straddled upon its belly. The apparatus has two pairs of circular knives swinging synchronously about an axis parallel to the symmetry plane of the fish and actuated to cut into the sides of fish in the region of the belly cavity of the fish and to be withdrawn in the region of the tail end of the fish.

---

Figure 1:
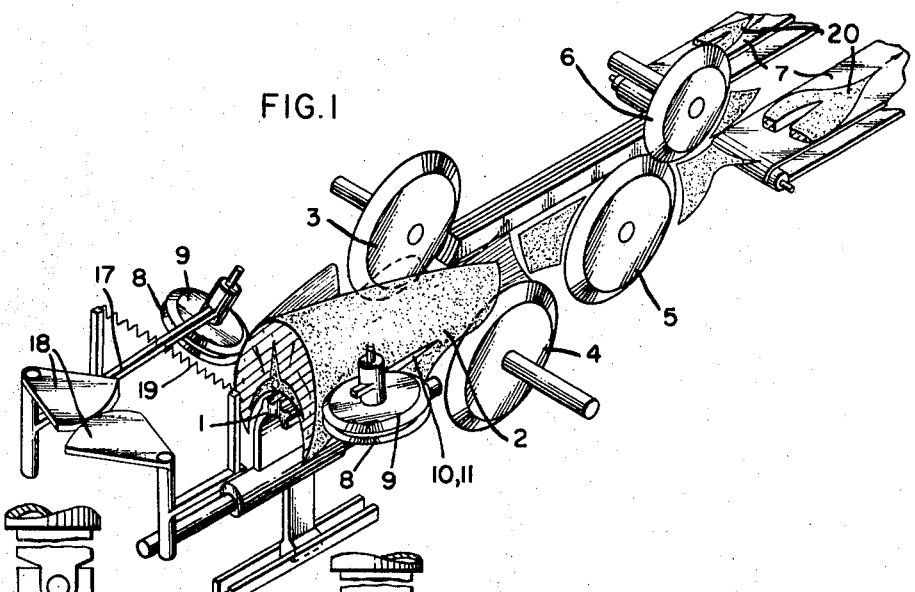

This application is a continuation of patent application Ser. No. 623,488 filed Feb. 14, 1967 which was a division of patent application Ser. No. 449,842, filed Apr. 21, 1965, now Pat. No. 3,319,287.

The invention relates to an apparatus for the production of fish fillets free from pinbones and has for its object to remove the pinbones in a perfect manner by mechanical means.

In the fish industry, the "flesh" or "hook" bones situated perpendicular to and on both sides of the symmetry plane of the fish which extend in the region of the belly cavity from the lower vertebral appendages (parapophyses) to just under the skin, are known as "pinbones."

As up to the present, there is no filleting process for producing fillets free from pinbones by mechanical means; the pinbones were either left in the fillets or tediously removed by hand. It has certainly been attempted to remove the pinbones by mechanical means in that they were cut out of the finished fillets resting on the skin with the aid of two circular knives, using the channel formed by the removal of the backbones as guide. This attempt was, however, not successful because, on the one hand, the pinbones are no longer situated in a plane when the fillet rests on its skin side and, on the other hand, the guiding of the soft fillets under the pair of knives could not be reliably controlled, and finally it was not possible for the operator to introduce the knives at the proper place.

It has now been found that the pinbones can be cut free in the whole fish in a simple manner if, before filleting, two incisions are made on each side of the fish from the outer side through the skin in the region of the belly cavity and extending to near the vertebral appendages (parapophyses). The double incisions can be carried out either as parallel cuts or is carried out by a device shown in FIG. 2 and comprising an arm 37 carried by a rod 34 attached to the push-saddle 1 and adapted to engage a roller 38. The roller 38 is connected by any suitable means 38a indicated diagrammatically in FIG. 2 to the left-hand arm 24 for the knives 8, 9. This construction makes it possible to swing the knives synchronously about an axis parallel to the symmetry plane of the fish to cut into the sides of the fish and then to withdraw them. In the push-saddle machine case of other kinds of fish the pinbones are cut free by parallel incisions after the fillets have been skinned. Possibly in combination with the trimming.

The incisions can be carried out so that the planes of the two upper incisions include an angle in the fish which is less than 180° to the back of the fish. In the case of parallel incisions the lower cuts include the same angle, whereas, in the case of wedge incisions, the lower cuts can be located in a horizontal plane.

The method is preferably carried out in the part of the filleting machine which is located in front of the filleting tools. For this purpose the fish must be gripped by the conveying mechanism (tail clamp, double belts, push saddle) and positioned with its symmetry plane in the operating plane of the tools. The time when the tools effecting the incisions come into operation must be determined by the size of the actual fish.

Figure 2:
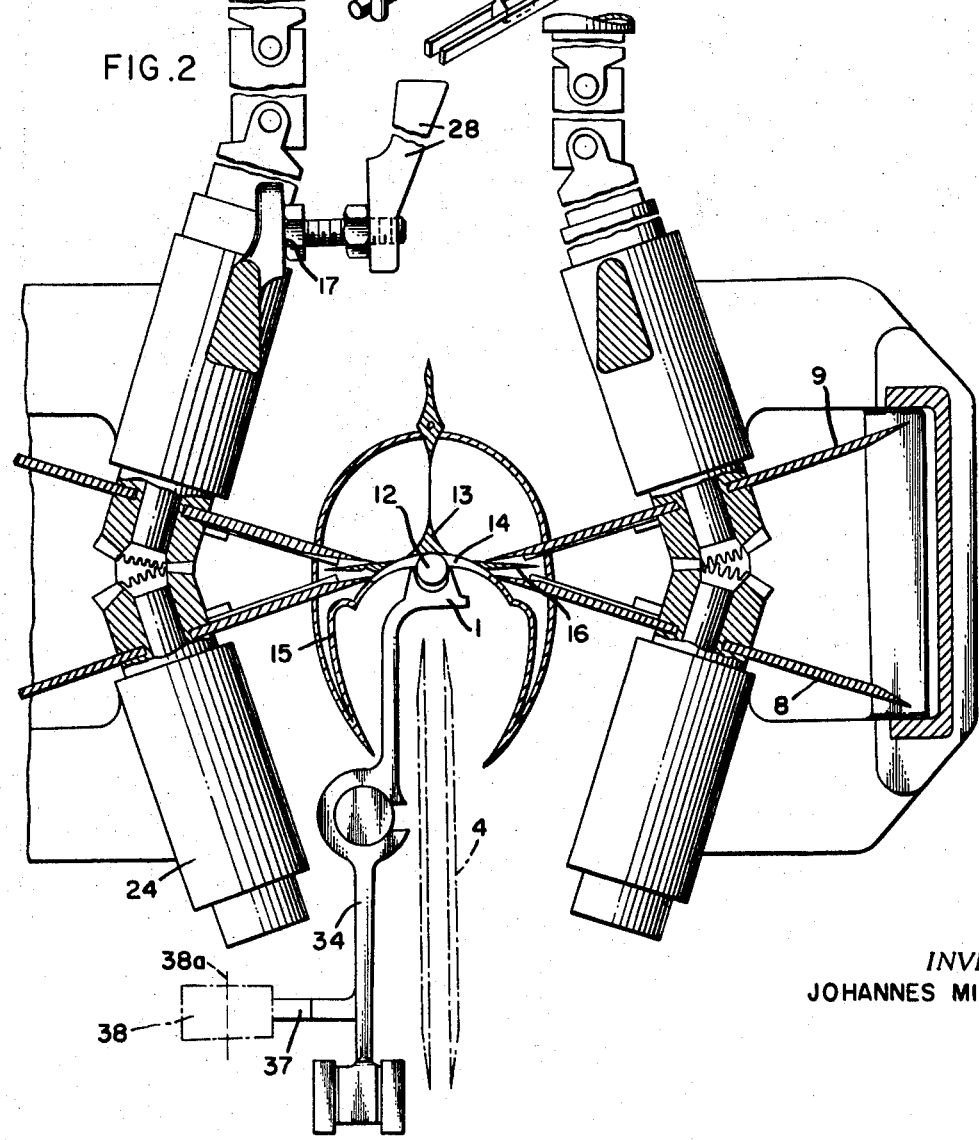

An apparatus particularly suitable for carrying out the present invention is produced by two pairs of circular knives arranged symmetrically to the cutting plane in the in-feed station of a push-saddle filleting machine, as illustrated in the accompanying drawing, in which FIG. 1 is a perspective diagrammatical view of a filleting machine with pinbone cutting arrangement, and FIG. 2 a cross-section through a fish taken in the region of the belly cavity and showing the planes of the incisions.

In FIG. 2, 12 designates a vertebra of the spine which carries the spike bones 13 extending towards the back and, above the belly cavity. The ends of the vertebral appendages (parapophyses) 14 are hingedly connected with the ribs 15 on the two sides of the fish. The pinbones, also called "flesh" or "hook" bones, 16 are hinged laterally to the vertebral appendages 14. The pairs of knives cutting free and severing the pinbones on each side of the fish are designated by 8/9.

In FIG. 1, the push-saddle 1 carries, straddled in the belly cavity, the fish 2 in the tail portion of which the pair of dorsal knives 3 and the pair of belly knives 4 have already commenced the filleting cuts. A pair of rib knives 5, a pair of severing knives 6 and fillet delivery belts 7 are shown diagrammatically.

The straddled fish 2 is fed between the pairs of swing-out circular knives 8/9 which allow the passage of the tail portion of the fish and, on the arrival of the end of the belly cavity, are released and penetrate the fish under the action of the tension spring 19. The depth of penetration at this point is adjustable by means of a stop 17 (FIG. 2) The two pairs of circular knives 8/9 are uniformly controlled by means of the segments 18. The circular knives 8/9 are driven in known manner, their direction of rotation being preferably chosen counter to the direction in which the fish is fed. The outward and inward control of the movable circular knives 8/9 is effected by conventional means shown in FIG. 2. In the push-saddle machine illustrated, this control is initiated in a simple manner by the carrier of the push-saddle. The depth of penetration of the circular knives can, if necessary, be adapted to the individual fish, in that the stop 17 is set according to a fish measurement.

The incisions made in the fish are designated by 10/11 and the fillets leaving the machine freed from pinbones by 20. In the example illustrated, the knives 8/9 on each side are shown as a pair of circular knives set at an angle to each other with their cutting edges almost in contact at the narrowest point. They then cut out on each side of the fish a wedge-shaped strip containing the pinbones and already separated from the fish before the filleting operation. This method in the most economical. As can be seen from FIG. 2, the bisector of the angle formed by the two circular knives of each side forms an angle of approximately 90° with the symmetry plane of the fish.

The arrangement illustrated and described is particularly practical, but the invention is not confined to the apparatus described. In particular, the separation of the pinbones can also be effected in a device which is separate from the filleting machine.

I claim:

1. An apparatus for producing fish fillets free from pinbones, comprising a movable saddle adapted to carry a fish straddled upon its belly, two pairs of circular knives located on opposite sides of said saddle, the knives of each pair extending at an acute angle to each other, the bisector of said angle extending substantially at an angle of ninety degrees to the symmetry plane of the fish, the saddle carrying the fish moving past said circular knives, and means connected with said circular knives and swinging them synchronously about an axis parallel to the symmetry plane of the fish to cut into the sides of the fish as the belly cavity of the fish is moving past the knives and to withdraw the knives as the tail end of the fish is moving past them.

2. An apparatus for producing fish fillets free from pinbones, comprising a movable saddle adapted to carry a fish straddled upon its belly, two pairs of circular knives located on opposite sides of said saddle, the saddle carrying the fish moving past said circular knives, and means connected with said circular knives and swinging them synchronously about an axis parallel to the symmetry plane of the fish to cut into the sides of the fish as the belly cavity of the fish is moving past the knives and to withdraw the knives as the tail end of the fish is moving past them.

References Cited

FOREIGN PATENTS 640,343    1/1937    Germany _____ 17—57

LUCIE H. LAUDENSLAGER, Primary Examiner